(12) United States Patent
Dames et al.

(10) Patent No.: US 6,369,965 B1
(45) Date of Patent: Apr. 9, 2002

(54) MAGNETIC INTERROGATION TECHNIQUES

(75) Inventors: Andrew Nicholas Dames; Michael David Crossfield, both of Cambridge (GB)

(73) Assignee: Flying Null Limited, Cambridge (GB)

( * ) Notice: Subject to any disclaimer, the term of this patent is extended or adjusted under 35 U.S.C. 154(b) by 0 days.

(21) Appl. No.: 09/269,952

(22) PCT Filed: Oct. 8, 1997

(86) PCT No.: PCT/GB97/02772

§ 371 Date: Jul. 20, 1999

§ 102(e) Date: Jul. 20, 1999

(87) PCT Pub. No.: WO98/15851

PCT Pub. Date: Apr. 16, 1998

(30) Foreign Application Priority Data

Oct. 9, 1996 (GB) ............................................. 9620999
Oct. 9, 1996 (GB) ............................................. 9621001

(51) Int. Cl.[7] ............................. G11B 5/00; G08B 13/14
(52) U.S. Cl. ........................................ 360/1; 340/572.1
(58) Field of Search .................. 360/1–2, 46; 340/572, 340/572.1

(56) References Cited

U.S. PATENT DOCUMENTS

| 3,765,007 A | * | 10/1973 | Elder ...................... 340/572.3 |
| 4,249,167 A | * | 2/1981 | Purinton et al. ............ 340/572 |
| 4,258,279 A | | 3/1981 | Hovorka |
| 4,593,209 A | | 6/1986 | Sloan |
| 4,635,227 A | | 1/1987 | Normann |
| 5,341,125 A | * | 8/1994 | Plonsky et al. ............. 340/572 |
| 5,736,929 A | * | 4/1998 | Schrott et al. ............. 340/572 |
| 5,909,176 A | * | 6/1999 | Schrott et al. ........... 340/572.1 |

FOREIGN PATENT DOCUMENTS

| EP | 713195 | 11/1994 |
| JP | 06124380 | * 5/1994 |

* cited by examiner

Primary Examiner—Regina Y. Neal
(74) Attorney, Agent, or Firm—Oppenheimer Wolff & Donnelly LLP

(57) ABSTRACT

A reader for interrogating a magnetic tag, e.g. for reading data stored in the tag, is described. The reader comprises a field generating device the magnetic field produced by which defines an interrogation zone, wherein said field generating device comprises: (a) means for generating a magnetic field: (b) a transmit coil for transmitting an interrogating electromagnetic signal into the interrogation zone so as to interact with a magnetic tag, when present in said interrogation zone; and (c) at least one receive coil for receiving an electromagnetic signal generated by a tag in response to said interrogating signal and the magnetic field produced by said magnetic field generating means. The field generating means can take the form of a pair of hollow cylinders, giving rise to a "loop" reader, or it can be a flat magnet, giving rise to a "side pass" reader.

20 Claims, 4 Drawing Sheets

FIG. 1: IMPROVED LOOP READER- TX AND RX COILS

FIG. 2 : IMPROVED LOOP READER-MAGNET ARRANGEMENT
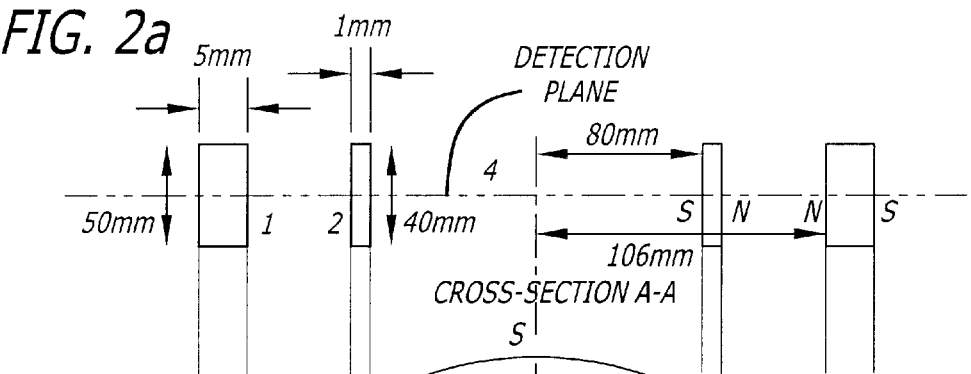
FIG. 2a
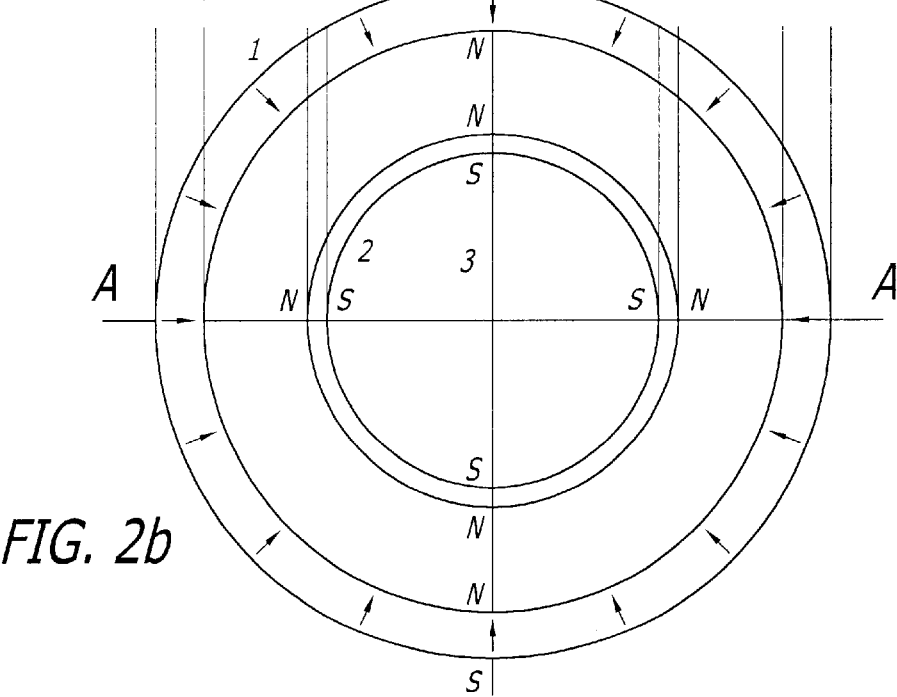
FIG. 2b
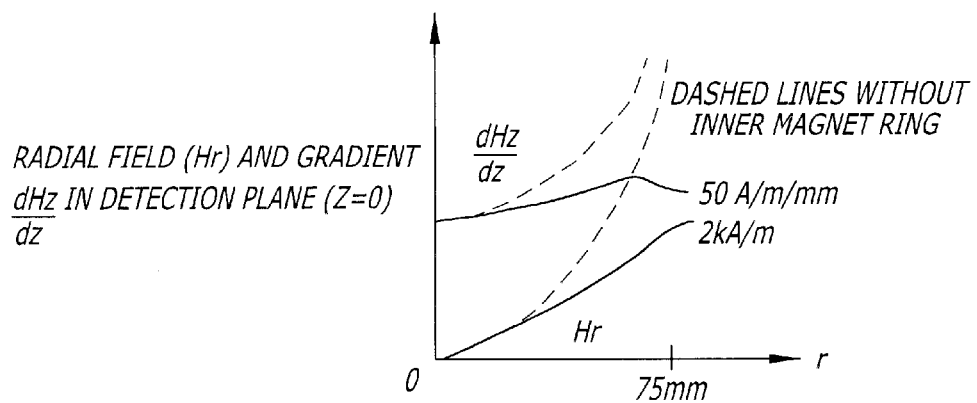
FIG. 3 : RADIAL FIELD VERSUS RADIAL DISTANCE

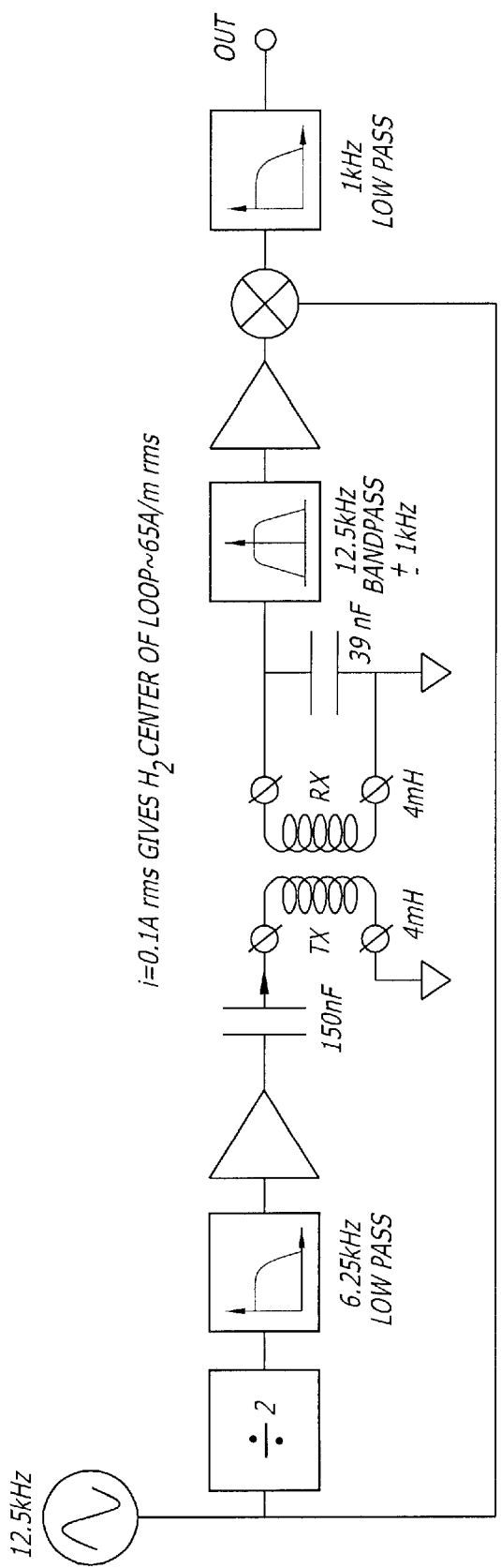
FIG. 4: SINE WAVE DRIVE, SECOND HARMONIC DETECTOR
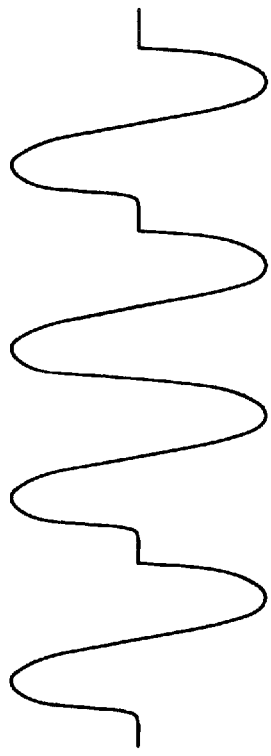
FIG. 5: TYPICAL OUTPUT FOR TAG CODED 101101

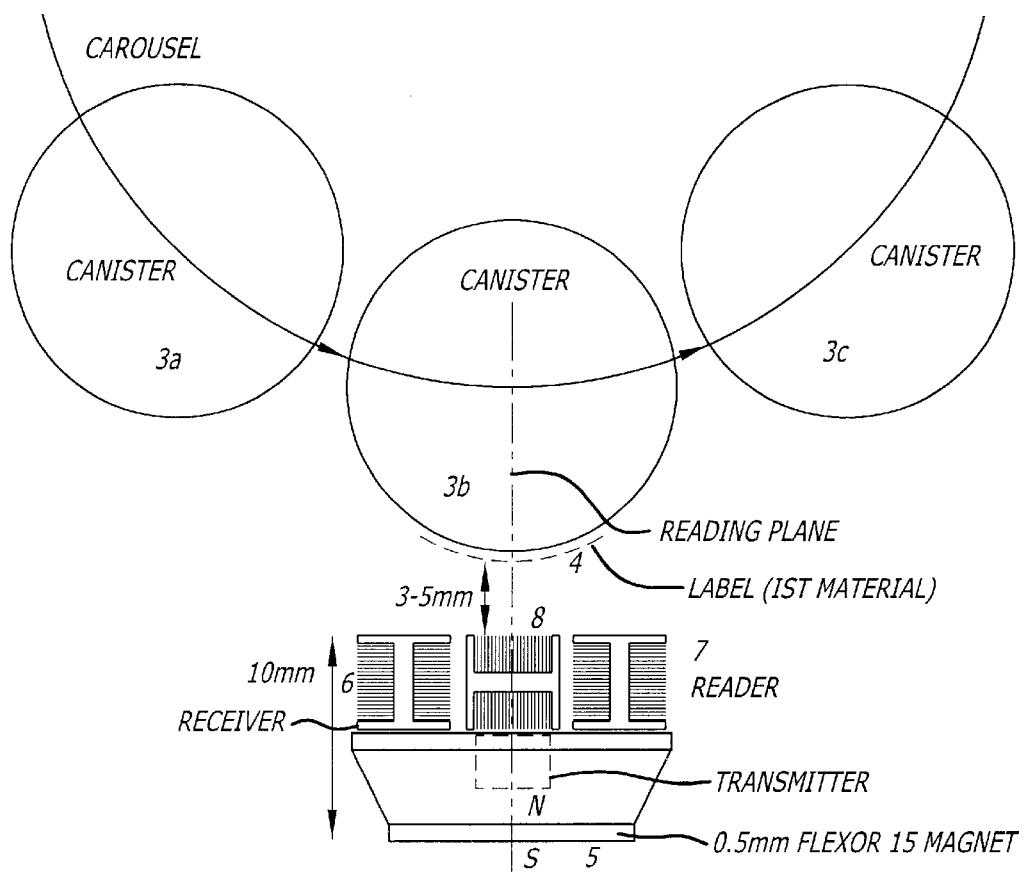
FIG. 6: TOP VIEW OF SINGLE-SIDED READER
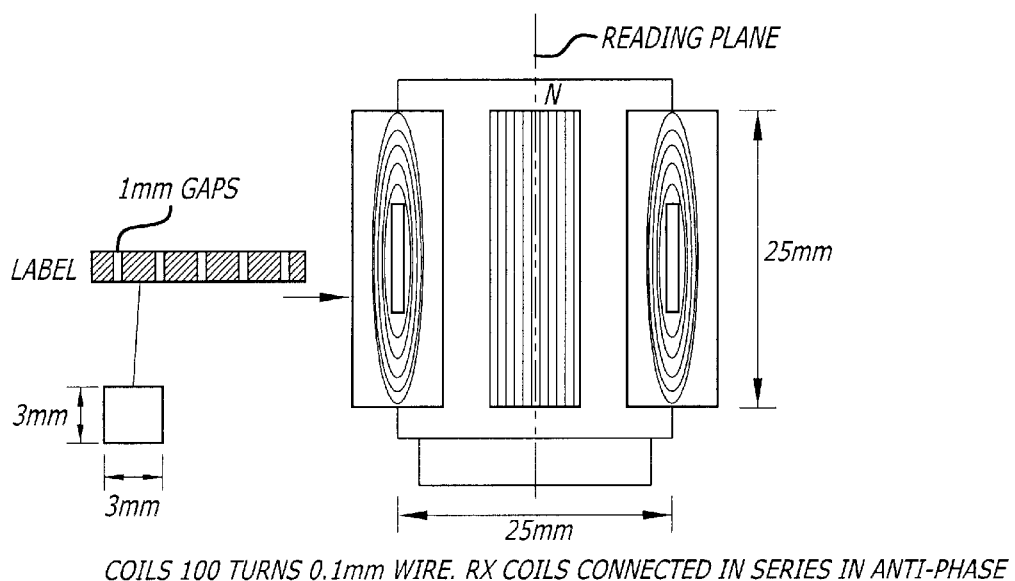
COILS 100 TURNS 0.1mm WIRE. RX COILS CONNECTED IN SERIES IN ANTI-PHASE
FIG. 7: FRONT VIEW OF READER

MAGNETIC INTERROGATION TECHNIQUES

In previous patent applications, in particular PCT/GB96/00823 (WO 96/31790) and PCT/GB96/00367 (WO 97/04338), we have described and claimed novel techniques for spatial magnetic interrogation and novel tags. The technology described in WO 96/31790 is based on exploiting the behaviour of magnetic materials as they pass through a region of space containing a magnetic null. In particular, these earlier applications describe, inter alia, how passive tags containing one or more magnetic elements can perform as remotely-readable data carriers, the number and spatial arrangement of the elements representing information.

in the above applications we described a number of possible system embodiments employing either permanent magnets or electromagnets to create the magnetic null. We also described several system implementations some of which are particularly appropriate for tags employing very low coercivity, high permeability magnetic elements. These implementations work by detecting harmonics of a superimposed low-amplitude alternating interrogation field.

In a later application, GB9612831.9, and its successor PCT/GB97/01662, we describe arrangements which work by detecting the baseband signals generated by the passage of the tag through the magnetic null, without the need for any superimposed alternating interrogation field. A specific design for a reader in the form of a narrow slot was described in GB9612831.9.

The present application relates to magnetic readers which can be used to read data from magnetic tags operating on the principles described in WO 96/31790 and/or in WO 97/04338.

According to on aspect of the present invention, there is povided a reader for interrogating a magnetic tag, e.g. for reading data stored in the tag, which reader comprises a field generating device the magnetic field produced by which defines an interrogation zone, wherein said field generating device comprises (a) means for generating a magnetic field; (b) a transmit coil for transmitting an interrogating electromagnetic signal into the interrogation zone so as to interact with a magnetic tag, when present in said interrogation zone; and (c) at least one receive coil for receiving an electromagnetic signal generated by a tag in response to said interrogating signal and the magnetic field produced by said magnetic field generating means.

In one embodiment, the field generating device is in the form of a pair of concentric hollow cylinders; with this embodiment, the interrogation zone is defined by the interior of the inner of the two concentric cylinders.

In another embodiment, the field generating device is a flat relatively thin magnet which has poles of one polarity, e.g. north, on one face and poles of the opposite polarity, e.g. south, on the other face. With this embodiment, the interrogation zone is defined by the volume of space disposed immediately adjacent to one of the faces of the magnet, the extent of the volume in the direction perpendicular to the plane of the magnet being governed by the extent of effective interaction between themagnetic field and a tag. This second embodiment is, in effect, a single-sided reader—i.e. a device for reading a magnetic tag which operates when the tag passes across the face of the reader.

These two embodiments will now be described in greater detail.

FIRST EMBODIMENT

The concentric hollow cylinders are preferably squat—i.e. the diameter of the device is relatively large compared to its length.

Preferably each of the concentric hollow cylinders supports or contains the means for generating a magnetic field; this is preferably a source of permanent magnetism, e.g. a ferrite magnet. The magnetic fields generated by such an arrangement is preferably radial—i.e the inner surface of a given one of the cylinders carries magnetic poles of a first polarity, e.g. north, while the outer surface of that cylinder carries magnetic poles of the opposite polarity, e.g. south. Further, it is preferred for the magnetic poles on the inner surface of the outer cylinder to correspond to those on the outer surface of the inner cylinder—opposed surfaces carrying poles of the same polarity—so that the arrangement may, for example, be S-N:N-S.

The presently preferred arrangement is to employ cylinders formed of a flexible polymer impregnated with a ferromagnetic material, e.g. ferrite. A suitable material for this purpose is "FLEXOR 15" manufactured and sold by Eclipse Magnetics Limited of Sheffield, England.

Preferably each of the two hollow cylinders carries both transmit and receive coils. The transmit coils are preferably wound on the cylinders in the same sense; and the receive coils are preferably wound on the two cylinders in opposite senses and connected in series.

The coils (transmit and receive) can be wound on the inner or outer surfaces of the two cylinders.

The transmit (Tx) coils are preferably positioned so that the net coupling between transmit and receive (Rx) coils is zero. This is advantageous in that it permits the use of relatively simple electronics to process the output from the receive coils and renders the system less sensitive to distortions in the transmitted waveform.

The transmit coils (one on each of the two cylinders) are generally connected in series. The windings of the inner transmit coil are preferably restricted to two zones—i.e. are clumped together on two bundles, rather than being uniformly or quasi-uniformly spread out over the surface which carries them. This arrangement gives a more uniform transmitted field across the radius of the interrogation zone.

The receive coil(s) can be wound uniformly or quasi-uniformly over the surface(s) which carry(ies) them.

The contrary-winding arrangement for the two receive coils described above is advantageous because it permits an overall Rx coil arrangement which has zero net dipole moment, the opposed dipole contributions of the two component Rx coils cancelling out. This in turn gives the overall Rx coil arrangement an octopole type fall off (i.e. proportional to $r^{-5}$) sensitivity with distance away from the coil (as compared to a dipole type fall off, which is proportional to $r^{-3}$), thereby resulting in very good rejection of magnetic interference from extraneous sources (e.g. VDU screens).

SECOND EMBODIMENT

Preferably the flat relatively thin magnet employed in this embodiment is in the form of a polymeric material containing permanently magnetised particles, e.g. of ferrite. For example, the material "FLEXOR 15" manufactured and sold by Eclipse Magnetics Limited of Sheffield, England may be used to form a thin (e.g. 0.5 mm) permanent magnet. Preferably the device includes two receive coils placed on either side of the transmit coil, all three coils being adjacent to, but spaced from, one face of a permanent magnet such as that just described. With such an arrangement, it is advantageous for the axes of the receive coils to be mutually parallel, and—to be perpendicular to the axis of the transmit coil. This arrangement minimises direct coupling between the transmit and receive coils. For example, the axes of the receive coils may be substantially parallel with the magnetic filed direction produced by the permanent magnet; and the axis of the transmit coil perpendicular to the magnetic field direction. This geometry is preferred because the sensitivity of the receive coils then has a quadrupole characteristic, thus allowing the reader to be relatively insensitive to interference caused by extraneous magnetic sources, e.g. VDU screens.

Where two receive coils are used, they are preferably wound in opposite senses, and connected electrically in series. This arrangement results in a zero dipole moment.

A reader in accordance with this second embodiment of the invention can have relatively small dimensions—e.g. 25 mm×25 mm×10 mm; and can "read" data from a magnetic tag without requiring direct contact between the tag and the reader. Typically, the reader is able to function adequately over a range of several millimetres—e.g. with a spacing of 3–5 mm between the tag and the reader.

Readers in accordance with this embodiment are of particular use in reading data from a series of tags presented sequentially to the reader; this is of benefit, for example, in apparatus which dispenses articles carrying a magnetic label or tag for identification/stock control/pricing or other commercial purposes. One example of such apparatus is a vending machine.

ILLUSTRATIONS OF THE INVENTION

The invention will now be described, by way of example, with reference to the accompanying drawings, in which:

FIGS. 2a and 2b show schematically the arrangement of the magnetic field producing parts of the reader of FIG. 1;

FIG. 3 shows schematically how the radial magnetic field ($H_r$) and the field gradient $dH_z/d_z$ varies with radial distance (r) from the detection plane in the reader of FIG. 1;

FIG. 4 shows a currently preferred circuit design for use with the reader of FIGS. 1 and 2;

FIG. 5 illustrates a typical output signal from a reader in accordance with this embodiment of the invention;

FIG. 6 shows a plan view of part of a drinks vending machine which includes a "side pass reader" in accordance with the second embodiment of the invention; and FIG. 7 shows a front elevational view of the reader FIG. 6.

Figure 1A:
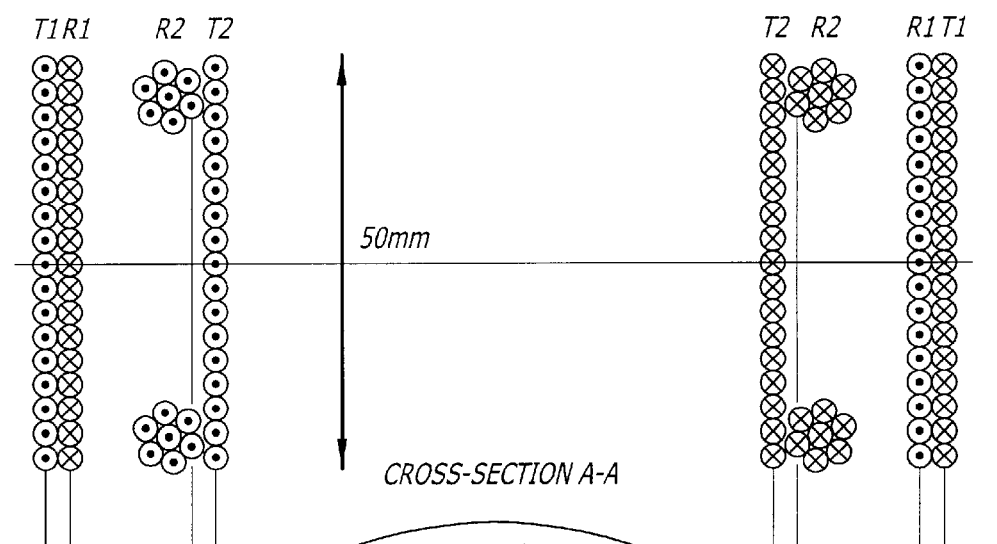
FIGS. 1a and 1b illustrate the winding of the transmit (Tx) and receive (Rx) coils in one embodiment of "loop readers" in accordance with this invention.
Figure 1B:
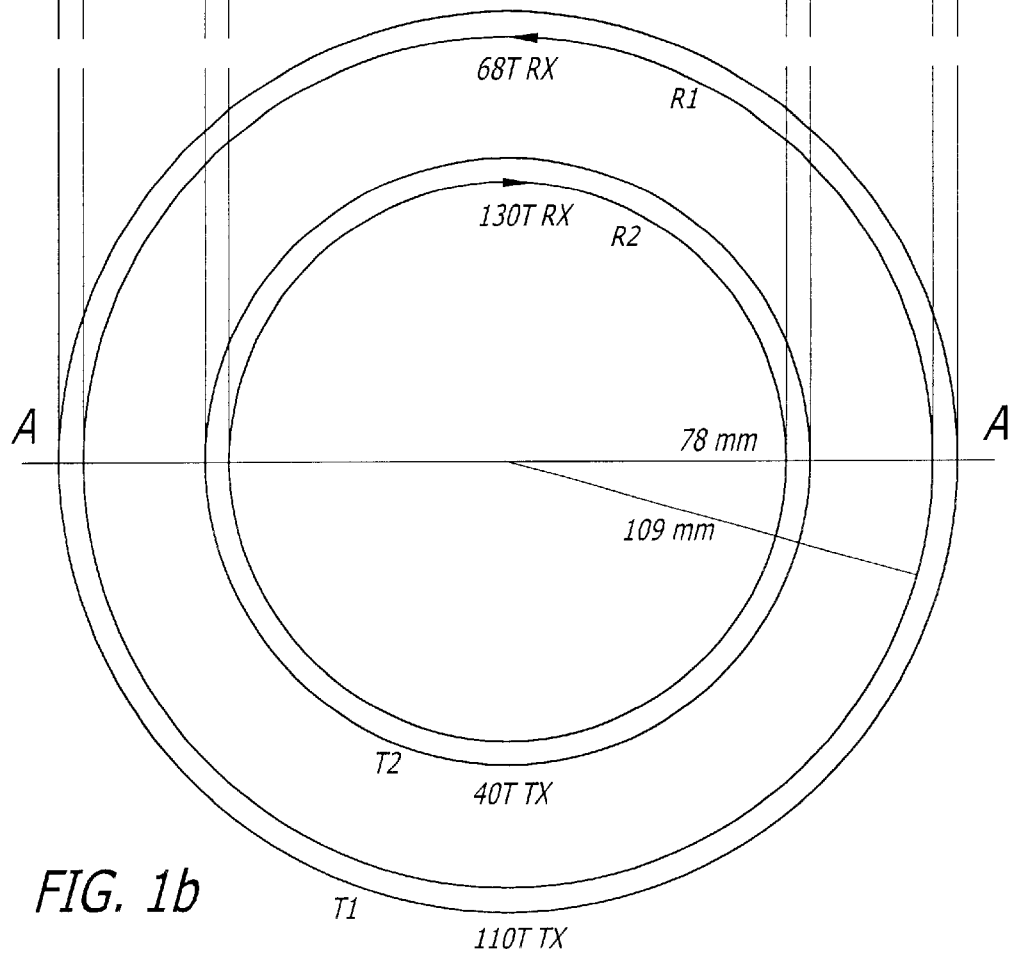

Referring now to the drawings, FIGS. 1(a) and 1(b) show the arrangement of Tx and Rx coils in this embodiment. The coils are supported by the hollow cylindrical magnetic bodies (not shown in FIG. 1—see FIG. 2). FIG. 1a is a cross-section perpendicular to the axes of the coils; and FIG. 1b is a plan view of the coils. As shown, the outer receive coil $R_1$ comprises 68 turns of radius 109 mm; and inner receive coil $R_2$ comprises 130 turns of radius 78 mm. The windings of $R_1$ and $r_2$ are opposite in sense, as indicated (using the dots and crosses convention); these two receive coils are connected in series.

Outer transmit coil $T_1$ comprises 110 turns of radius 109 mm and inner transmit coil $T_2$ comprises 40 turns of radius 79 mm. Both transmit coils are wound in the same sense, and are connected in series.

This arrangement of the coils results in zero net coupling between Rx and Tx coils, and ensures that the Rx coils have zero net dipole moment.

Referring next to FIG. 2, the two hollow cylindrical bodies 1 and 2 are formed of "FLEXOR 15" and are disposed so that outer body 1 has south magnetic poles on its on its outer surface and north magnetic poles on its inner surface; while inner body 2 has north magnetic poles on its outer surface and south magnetic poles on its inner surface. The central space 3 defined within body 2 constitutes the interrogation zone through which, in use, a magnetic tag is passed. The plane 4 perpendicular to the axes of the coaxial cylinders 1 and 2 defines a detection plane. Magnetic body 1 has a thickness of 5 mm and an axial extent of 50 mm; and magnetic body 2 has a thickness of 1 mm and an axial extent of 40 mm. The field pattern generated by this arrangement has a substantially uniform gradient over the whole of detection plane 4, and hence the minimum radial field within the detection plane itself. This permits the field gradient to be relatively high (typically 3–5 kA/m), thereby giving better resolution, without causing a magnetic tag (e.g. an IST-type thin film material with anisotropic magnetic properties) whose data is being read to become saturated by the magnetic field along its non-preferred axis of magnetisation.

FIG. 3 shows how the field gradient $dH_z/d_z$ is substantially constant across the interrogation zone (i.e. practically invariant with r); and also that the radial field $H_r$ is essentially zero at the detection plane, and increases rapidly with radial distance from that plane. The dashed lines show how the two plots would be if the inner body 2 were removed, thus demonstrating the effectiveness of this invention.

FIG. 4 illustrates a preferred electrical circuit for a reader in accordance with this invention. The circuit comprises a sine wave drive 10 operating at 12.5 kHz; a frequency divider (÷2) 11; a low pass filter 12 removing frequencies significantly higher than 6.25 kHz; a buffer amplifier 13; and a capacitor 14 of 150 nF connected to one end of the transmit coils 15; these have an inductance of 4 mH and carry a current of 0.1 A rms. This gives a value of $H_z$ at the centre of the "loop" defined by the cylinders 1, 2 of approximately 65 A/m rms.

On the receive coils (16) side of the circuit, a capacitor 17 is placed in parallel with the coils 16, and the output is passed to a band pass filter 18 operating at 12.5 kHz±1 kHz. The filtered output is supplied to a buffer amplifier 19 and is then combined at 20 with the source signal from driver 10. The summed signals then pass to a 1 kHz low pass filter 21 whose output 22 represents the output of the reader.

A typical output from the reader is illustrated at FIG. 5; the detailed signal depends on the magnetic characteristics of the tag which is being interrogated.

Referring nest to FIG. 6 of the drawings, the reader 31 is positioned adjacent to a carousel 32 which conveys drinks cartons such as 33a, 33b and 33c. Each of these carries a magnetic label or tag 34 which is typically an IST material—a thin film anisotropic magnetic material well known in connection with anti-pilferage applications.

The reader 31 comprises a permanent magnet 35, a first receive coil 36, a second receive coil 37 and a transmit coil 38. The coils are spaced from magnet 35 by a distance of about 5 mm. Receive (Rx) coils 36 and 37 are wound in antiphase and are connected in series. The axes of the RX coils 36, 37 are parallel with the field direction while the axis of the transmit (TX) coil 38 is perpendicular to the field direction.

The dimensions of the reader in this embodiment are of the order of 25 mm×25 mm×10 mm. Each of the coils comprises 100 turns of 0.1 mm copper wire. The output of the Rx coils forms part of an electrical circuit such as that described above in conjunction with FIG. 4.

In operation, carousel 32 turns in the direction of arrow 39 as drinks are ordered and dispensed. As each container 33 moves round the carousel, its magnetic label 34 is oriented outwardly so as to be read by the reader device 31. Such a label may typically comprise a series of active magnetic regions of about 3 mm×3 mm separated by non-magnetic regions or gaps typically about 1 mm (seen in the direction of movement of the container).

Typically, each of the coils may comprise 100 turns of 0.1 mm copper wire.

The invention is not restricted to the embodiments described above, which are given as non-limiting examples.

What is claimed is:

1. A reader for interrogating a magnetic tag having at least one magnetically active element, which reader comprises: (1) a field generating means for generating a magnetic field within an interrogation zone; and (2) at least one receive coil for receiving an electromagnetic signal generated by the magnetically active element(s) in response to the field generated by said magnetic field generating means, wherein the field generating means comprises: (a) at least one permanent magnet to create a static magnetic field within said interrogation zone; and (b) at least one transmit coil for generating an alternating magnetic field within said interrogation zone.

2. A reader as claimed in claim 1, characterized in that said permanent magnet(s) is in the form of a pair of concentric hollow cylinders, the interrogation zone being defined by the interior of the inner of the two concentric cylinders.

3. A reader as claimed in claim 2, wherein said concentric hollow cylinders are squat—i.e. their diameter is relatively large compared to their length.

4. A reader as claimed in claim 2, wherein each of the concentric hollow cylinders supports or comprises a permanent magnet arranged to generate a radial magnetic field, wherein the inner surface of one of the cylinders is of a first magnetic polarity, while the outer surface of that cylinder is of the opposite polarity.

5. A reader as claimed in claim 4, wherein the magnetic poles on the inner surface of the outer cylinder correspond to the magnetic poles on the outer surface of the inner cylinder, so that opposed surfaces carry magnetic poles of the same polarity.

6. A reader as claimed in claim 2, wherein said cylinders are each formed of a flexible polymer impregnated with a ferromagnetic material.

7. A reader as claimed in claim 6, wherein the ferromagnetic material is ferrite.

8. A reader as claimed in claim 2, wherein each of the hollow cylinders carries both transmit and receive coils.

9. A reader as claimed in claim 2, wherein the transmit coils are wound on the two cylinders in the same sense; and the receive coils are wound on the two cylinders in opposite senses and are connected in series.

10. A reader as claimed in claim 1, characterized in that said permanent magnet is in the form of a flat relatively thin magnet in which one face is of a first magnetic polarity and the other face is of the opposite polarity, wherein the interrogation zone is disposed immediately adjacent to one of the faces of said magnet.

11. A reader as claimed in claim 8, which comprises two receive coils placed on either side of a single transmit coil, all three coils being adjacent to, but spaced from, one face of said permanent magnet.

12. A reader as claimed in claim 11, wherein the axes of the receive coils are mutually parallel, and are perpendicular to the axis of the transmit coil.

13. A reader as claimed in claim 12, wherein the axes of the receive coils are substantially parallel to the magnetic filed direction produced by the permanent magnet; and the axis of the transmit coil is substantially perpendicular to said magnetic field direction.

14. A reader as claimed in claim 11, wherein said receive coils are wound in opposite senses (i.e. in antiphase), and are connected electrically in series.

15. A reader as claimed in claim 8 wherein the flat relatively thin magnet is in the form of a polymeric material containing permanently magnetized particles.

16. A reader as claimed in claim 15, wherein the flat relatively thin magnet is in the form of a ferromagnetic material including ferrite.

17. A reader for interrogating a magnetic tag having at least one magnetically active element, which reader comprises: (1) a field generator for generating a magnetic field within an interrogation zone; and (2) at least one receive coil for receiving an electromagnetic signal generated by the magnetically active element(s) in response to the field generated by said magnetic field generator, wherein the field generator comprises: (a) at least one magnet for creating a static magnetic field within said interrogation zone; and (b) at least one transmit coil for generating an alternating magnetic field within said interrogation zone.

18. A reader as defined in claim 17 wherein said magnet for creating a static magnetic field is a permanent magnet.

19. A reader for interrogating a magnetic tag having at least one magnetically active element, which reader comprises: (1) a field generating means for generating a magnetic field within an interrogation zone; and (2) at least one receive coil for receiving an electromagnetic signal generated by the at least one magnetically active element in response to the field generated by said magnetic field generating means, wherein the field generating means comprises: (a) a means to create a static magnetic field within said interrogation zone, wherein said static magnetic field comprises a first region at which the component of the magnetic field resolved in a first direction is zero, and where in regions contiguous with said first region the component of the magnetic field resolved in said first direction is sufficient to saturate the, or a part of the, at least one magnetically active element; and (b) at least one transmit coil for generating an alternating magnetic field within said interrogation zone.

20. A reader for interrogating a magnetic tag having at least one magnetically active element, which reader comprises: (1) a field generator for generating a magnetic field within an interrogation zone; and (2) at least one receive coil for receiving an electromagnetic signal generated by the magnetically active element in response to the field generated by said magnetic field generator, wherein the field generator comprises: (a) a means to create a static magnetic field within said interrogation zone, wherein said static magnetic field comprises a first region at which the component of the magnetic field resolved in a first direction is zero, and where in regions contiguous with said first region the component of the magnetic field resolved in said first direction is sufficient to saturate the, or a part of the, at least one magnetically active element; and (b) at least one transmit coil for generating an alternating magnetic field within said interrogation zone.

* * * * *